United States Patent
Ha et al.

(10) Patent No.: US 12,372,830 B1
(45) Date of Patent: Jul. 29, 2025

(54) BACKLIGHT UNIT AND DISPLAY DEVICE INCLUDING THE SAME

(71) Applicant: LG ELECTRONICS INC., Seoul (KR)

(72) Inventors: Seungsu Ha, Seoul (KR); Yongmin Jung, Seoul (KR); Seunghwan Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/787,870

(22) Filed: Jul. 29, 2024

(51) Int. Cl.
   *G02F 1/13357* (2006.01)
   *G02F 1/1335* (2006.01)

(52) U.S. Cl.
   CPC .. *G02F 1/133609* (2013.01); *G02F 1/133603* (2013.01); *G02F 1/133607* (2021.01); *G02F 1/133614* (2021.01)

(58) Field of Classification Search
   CPC ......... G02F 1/133609; G02F 1/133614; G02F 1/133607; G02F 1/133603
   See application file for complete search history.

(56) References Cited

U.S. PATENT DOCUMENTS

| | | | | |
|---|---|---|---|---|
| 11,209,697 | B1 * | 12/2021 | Tseng | H10H 20/8513 |
| 2016/0097495 | A1 * | 4/2016 | Yamamoto | H10H 20/8512 |
| | | | | 349/65 |
| 2017/0137628 | A1 | 5/2017 | Szwarcman et al. | |
| 2017/0261673 | A1 | 9/2017 | Kim et al. | |
| 2018/0341055 | A1 * | 11/2018 | Yuan | G02F 1/133603 |

FOREIGN PATENT DOCUMENTS

| | | | |
|---|---|---|---|
| KR | 1020170082187 | 7/2017 | |
| KR | 1020190088046 | 7/2019 | |
| KR | 1020200127648 | 11/2020 | |
| KR | 102287244 B1 * | 8/2021 | |
| WO | WO-2023182599 A1 * | 9/2023 | G02B 5/206 |

OTHER PUBLICATIONS

Korean Intellectual Property Office Application No. 10-2024-0046779, Office Action dated Oct. 17, 2024, 8 pages.
European Patent Office Application Serial No. 24188766.0, Search Report dated Dec. 23, 2024, 6 pages.

* cited by examiner

*Primary Examiner* — Mariceli Santiago
(74) *Attorney, Agent, or Firm* — LEE, HONG, DEGERMAN, KANG & WAIMEY

(57) ABSTRACT

Disclosed is a backlight unit, including a light assembly having a light emitting lamp emitting a first light of a first wavelength band and a resin cover surrounding the light emitting lamp and including a first phosphor and a second phosphor, and an optical sheet including a third phosphor and optically converting an incident light of the light assembly incident on a rear surface to emit the optically converted light to a front surface, wherein the first phosphor converts the first light into a second light of a second wavelength band greater than the first wavelength band, wherein the second phosphor converts the first light into a third light of a third wavelength band greater than the second wavelength band, and wherein the third phosphor converts the second light into the third light of the third wavelength band.

11 Claims, 9 Drawing Sheets

BACKLIGHT UNIT AND DISPLAY DEVICE INCLUDING THE SAME

CROSS-REFERENCE TO RELATED APPLICATION(S)

Pursuant to 35 U.S.C. § 119, this application claims the benefit of earlier filing date and right of priority to Korean Application No(s). 10-2024-0046779, filed on Apr. 5, 2024, the contents of which are all incorporated by reference herein in its entirety.

BACKGROUND OF THE DISCLOSURE

Field of the Disclosure

The present disclosure relates to a backlight unit capable of implementing high color reproduction and display device including the same.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

Recently, materials such as OLEDs, which are self-illuminating without a backlighting structure on the backside, have allowed for the realization of bendable display modules, enabling the realization of curved display devices. However, high-performance and high-definition OLED TVs are also developing technologies to similarly secure the advantages of OLEDs with LCDs due to price competitiveness.

A display device using quantum dots has been released to improve a color reproducibility using LCD. The color reproducibility may be increased by adding a high-color sheet including quantum dots containing heavy metals such as cadmium, selenium, lead, zinc, etc.

However, cadmium-based quantum dots contain toxic substances and are vulnerable to moisture, so additional materials such as a barrier film and the like are required to secure safety and reliability. Accordingly, there are problems of an increased product size and a raised material cost.

SUMMARY OF THE DISCLOSURE

Accordingly, embodiments of the present disclosure are directed to a backlight unit and display device including the same that substantially obviate one or more problems due to limitations and disadvantages of the related art.

One object of the present disclosure is to provide a backlight unit capable of implementing high color reproduction and display device including the same.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a backlight unit according to the present disclosure may include a light assembly having a light emitting lamp emitting a first light of a first wavelength band and a resin cover surrounding the light emitting lamp and including a first phosphor and a second phosphor and an optical sheet including a third phosphor and optically converting an incident light of the light assembly incident on a rear surface to emit the optically converted light to a front surface, wherein the first phosphor may convert the first light into a second light of a second wavelength band greater than the first wavelength band, wherein the second phosphor may convert the first light into a third light of a third wavelength band greater than the second wavelength band, and wherein the third phosphor may convert the second light into the third light of the third wavelength band.

The optical sheet may include a prism sheet and a coating layer including the third phosphor and formed on a rear surface of the prism sheet.

The third phosphor included in the coating layer may be equal to or greater than 0.01% and equal to or smaller than 0.03%.

The third phosphor may emit a red light having a maximum light emitting wavelength in a range of 610 to 660 nm.

The third phosphor may include a nano organic material.

The third phosphor may include at least one of a pyromethene metal complex-based phosphor, a rhodamine-based phosphor, a DCM-based phosphor, or a peryleneimide-based phosphor.

The first wavelength band may include 440 to 460 nm, the second wavelength band may include 510 to 560 nm, and the third wavelength band may include 610 to 660 nm.

The light emitted from the optical assembly may be a white light obtained by synthesizing the first light, the second light, and the third light.

The first phosphor may include a green phosphor and the second phosphor may include a red phosphor.

And, an amount of the second phosphor may be less than that of the first phosphor.

In another aspect of the present disclosure, a display device according to another embodiment of the present disclosure may include a display panel and a backlight unit located on a rear surface of the display panel to supply light to the display panel, the backlight unit including a light assembly having a light emitting lamp emitting a first light of a first wavelength band and a resin cover surrounding the light emitting lamp and including a first phosphor and a second phosphor and an optical sheet including a third phosphor and optically converting an incident light of the light assembly incident on a rear surface to emit the optically converted light to a front surface, wherein the first phosphor may convert the first light into a second light of a second wavelength band greater than the first wavelength band, wherein the second phosphor may convert the first light into a third light of a third wavelength band greater than the second wavelength band, and wherein the third phosphor may convert the second light into the third light of the third wavelength band.

Accordingly, the present disclosure provides the following effects and/or advantages.

In a backlight unit of the present disclosure, a high color reproduction quantum dot sheet may be omitted to improve color reproduction, so that a price and a volume may be reduced.

In addition, it is possible to prevent a color reproducibility of a screen from appearing unevenly according to the distribution of quantum dots.

In addition, it is possible to reduce a manufacturing cost by lowering an amount of phosphor used.

The effects obtained by the present disclosure are not limited to the above-mentioned effects, and other effects not mentioned will be clearly understood by those skilled in the art to which the present disclosure pertains from the following description.

BRIEF DESCRIPTION OF THE DRAWINGS

The accompanying drawings, which are included to provide a further understanding of the disclosure and are incorporated in and constitute a part of the present application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION OF THE DISCLOSURE

Figure 1:
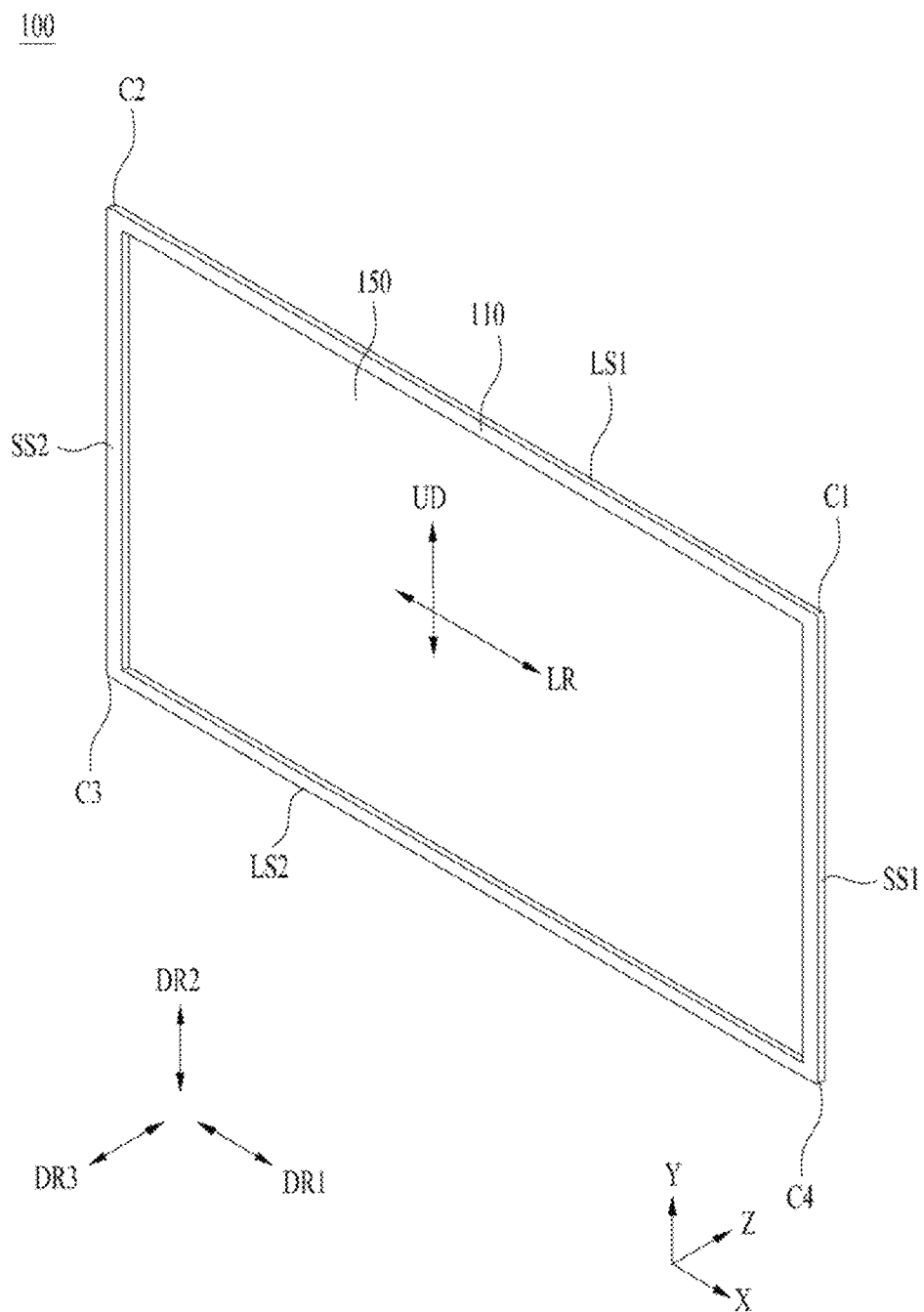
FIG. 1 is a perspective diagram illustrating an example of a display device of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a front perspective diagram illustrating an example of a display device of the present disclosure. A display device 100 of the present disclosure may have a rectangular main body including a pair of long sides and a pair of short sides. It may include a first long side LS1, a second long side LS2 facing the first long side LS1, a first short side SS1 adjacent to the first long side LS1 and the second long side LS2, and a second short side SS2 facing the first short side SS1.

A long side extending in a horizontal direction and a short side extending in a vertical direction are illustrated in the drawing, but the long side and the short side may have the same length, and the long side may be disposed in the vertical direction.

For convenience of explanation, the following description is made based on an embodiment in which a side extending in the horizontal direction (i.e., x-axis direction) and a side extending in the vertical direction (i.e., y-axis direction) are referred to as a long side and a short side, respectively, but the present disclosure is not limited thereto.

A first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The side of the display device 100 on which a picture is displayed may be referred to as a front side or a front surface. When the display device 100 displays the picture, the side of the display device 100 from which the picture cannot be viewed may be referred to as a rear side or a rear surface.

When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

The display device may include a display unit 120 configured to output an image. A driving signal may be generated by converting an image signal, a data signal, an OSD signal, a control signal, or the like received from the interface unit, which are processed by the controller 180. The display unit 150 may include a display panel including a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

The display device 100 includes a display unit 120 that occupies most of a front area and a case that covers a rear side, a lateral side and the like of the display unit 120 and packages the display unit 120.

The display unit 150 may be a Plasma Display Panel (PDP), a Liquid Crystal Display (LCD), an Organic Light Emitting Diode (OLED), a flexible display, or the like, and may also be a 3D display. The 3D display unit 150 may be classified into a glasses-free type or a glasses type.

An LCD display is supplied with light through a backlight unit because it is difficult to emit light by itself. The backlight unit is a device that uniformly supplies light supplied from a light emitting lamp to liquid crystals located on a front surface. As the backlight unit becomes thinner and thinner, a thin LCD can be implemented.

Figure 2:
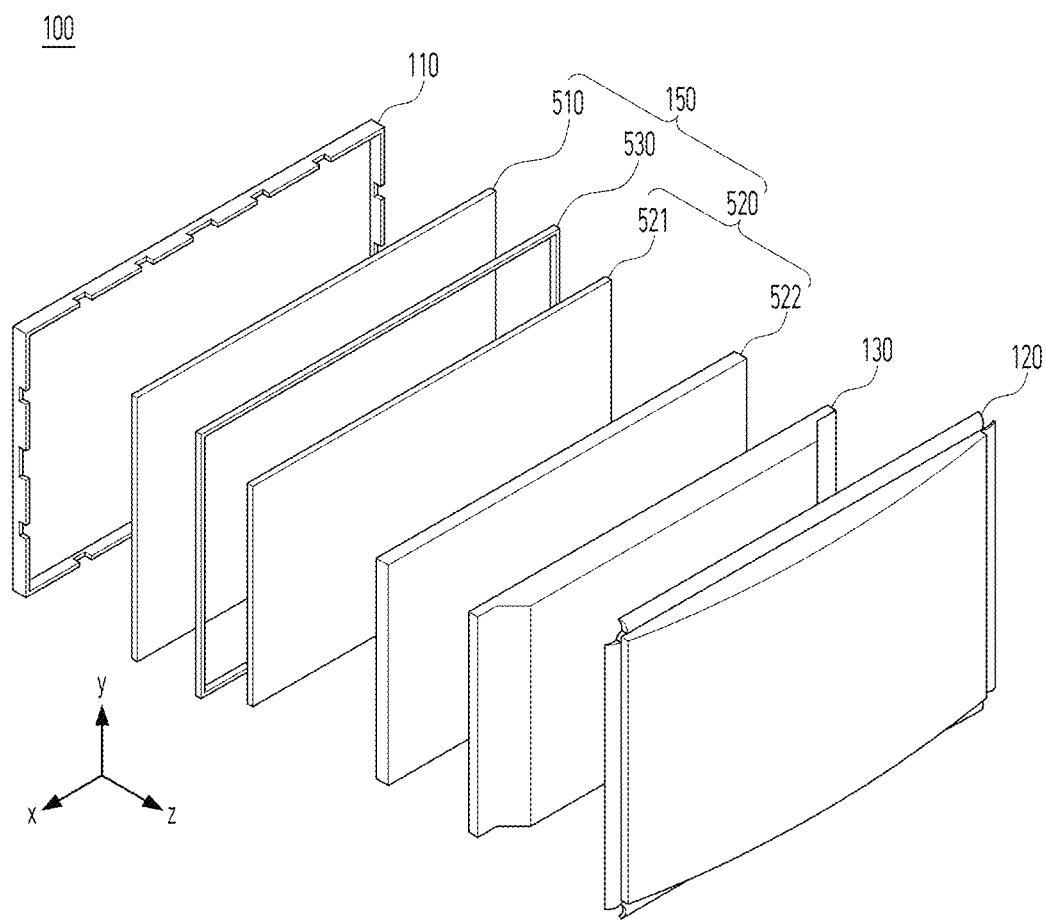
FIG. 2 is an exploded perspective diagram illustrating an example of a display device of the present disclosure.

FIG. 2 is an exploded diagram illustrating a display device of the present disclosure. Referring to FIG. 2, a display unit 120 of the present disclosure is an LCD display including a display panel 510 and a backlight unit 520.

A front cover 110 may cover at least a portion of a front surface and a side surface of the display panel 510. The front cover 110 may be divided into a front cover positioned on a side of the front surface of the display panel 510 and a side cover positioned on a side of the side surface of the display panel 510. The front cover and the side cover may be separately configured. One of the front cover and the side cover may be omitted.

The display panel 510 is provided to a front surface of the display device 100 to display an image. The display panel 510 may display an image by allowing a plurality of pixels to output Red, Green, or Blue (RGB) per pixel according to a timing. The display panel 510 may be divided into an active area in which an image is displayed and a de-active area in which an image is not displayed. The display panel 510 may include a front substrate and a rear substrate facing each other with a liquid crystal layer interposed therebetween.

The front substrate may include a plurality of pixels consisting of Red (R), Green (G), and Blue (B) subpixels. The front substrate may output light corresponding to a color of red, green, or blue according to a control signal.

The rear substrate may include switching elements. The rear substrate may switch pixel electrodes. For example, the pixel electrode may change molecular arrangement of a liquid crystal layer according to a control signal applied from the outside. The liquid crystal layer may include liquid crystal molecules. The liquid crystal molecules may change the arrangement based on a voltage difference generated between a pixel electrode and a common electrode. The liquid crystal layer may transmit the light provided from the backlight unit 520 to the front substrate or block the light.

The backlight unit 520 may be located behind the display panel 510. The backlight unit 520 may include light sources. The backlight unit 520 may be coupled to a front side of a frame 130.

The backlight unit 520 may be driven in a full driving mechanism or a partial driving mechanism such as local dimming or impulsive. The backlight unit 520 may include an optical sheet 521 and an optical layer 522.

A guide panel 530 for aligning the positions of the display panel 510 and the backlight unit 520 may be included. The guide panel 530 has a frame shape having four sides, and the display panel 510 and the backlight unit 520 may be seated on a front surface.

The optical sheet 521 may allow light from a light assembly 524 to be evenly transmitted to the display panel 510. The optical sheet 521 may be composed of layers. For example, the optical sheet 521 may include a prism sheet, a diffusion sheet, and the like.

The optical sheet 521 may include a coupling part. The coupling part may be coupled to the front cover 110, the frame 130, and/or the back cover 120. Alternatively, the coupling part may be coupled to a structure formed/coupled on/to the front cover 110, the frame 130, and/or the back cover 120.

The frame 130 may serve to support components of the display device 100. For example, a configuration such as the backlight unit 520 may be coupled to the frame 130. The frame 130 may be made of a metal material such as an aluminum alloy, etc.

The back cover 120 may be located on or behind a rear surface of the display device 100. The back cover 120 may be coupled to the frame 130 and/or the front cover 110. For example, the back cover 120 may be an injection molding product made of a resin material.

Figure 3:
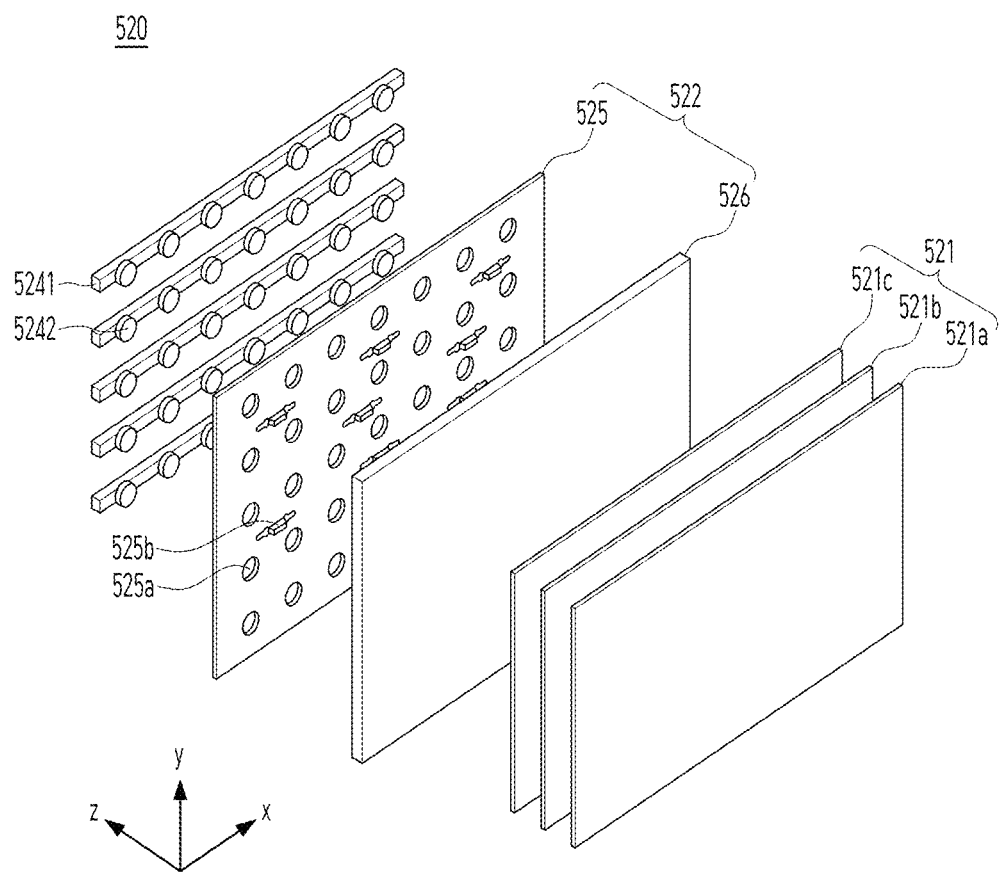
FIG. 3 is a diagram illustrating an embodiment of a backlight unit of a display device.

FIG. 3 is a diagram illustrating an embodiment of the backlight unit 520 of the display device 100.

The backlight unit 520 may include a light assembly 524, an optical layer 522 including a reflective sheet 525 and a diffusion plate 526, and an optical sheet 521 located on a front side of the optical layer 522.

The present embodiment is characterized in that the light assembly 524 is disposed in an array in a rear direction of the display panel 510 as a direct backlight unit 520. The light assembly 524 may include a substrate 5241 and a light emitting lamp 5242 mounted on the substrate 5241.

The substrate 5241 may be configured in the form of a plurality of straps extending in a first direction and spaced apart from each other by a prescribed distance in a second direction orthogonal to the first direction.

At least one light emitting lamp 5242 may be mounted on the substrate 5241. An electrode pattern for connecting an adapter and the light emitting lamp 5242 may be formed on the substrate 5241. For example, a carbon nanotube electrode pattern for connecting the light emitting lamp 5242 and the adapter may be formed on the substrate 5241.

The substrate 5241 may be composed of at least one of polyethylene terephthalate (PET), glass, polycarbonate (PC), and silicon. The substrate 5241 may be a Printed Circuit Board (PCB) on which the at least one light emitting lamp 5242 is mounted.

The light emitting lamp 5242 may be disposed on the substrate 5241 at a prescribed interval in the first direction. A diameter of the light emitting lamp 5242 may be greater than a width of the substrate 5241. That is, it means that the diameter may be greater than the length of the substrate 5241 in the second direction.

The light emitting lamp 5242 may be a light emitting diode (LED) chip or a light emitting diode package including at least one light emitting diode chip.

The light emitting lamp 5242 may be composed of a colored LED or a white LED that emits at least one color among colors such as Red (R), Blue (B), Green (G), and the like. The colored LED may include at least one of a red LED, a blue LED, and a green LED.

The reflective sheet 525 may be located on a front side of the substrate 5241. The reflective sheet 525 may be located on an area other than an area in which the light emitting lamp 5242 of the substrate 5241 is formed. The reflective sheet 525 may include a plurality of through-holes 525a.

The reflective sheet 525 may reflect the light emitted from the light emitting lamp 5242 toward the front side. Also, the reflective sheet 525 may reflect the light reflected from the diffusion plate 526 again.

A diffusion plate supporter 525b that maintains a gap between the light emitting lamp 5242 and the diffusion plate 526 may be further included so that the light of the light emitting lamp 5242 is evenly supplied to a rear surface of the diffusion plate 526.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide ($TiO_2$).

A resin may be deposited on the light emitting lamp 5242 and/or the reflective sheet 525. The resin may serve to diffuse light emitted from the light emitting lamp 5242. The diffusion plate 526 may diffuse light emitted from the light emitting lamp 5242 upward.

The optical sheet 521 may be positioned in front of the diffusion plate 526. A rear surface of the optical sheet 521 may be in close contact with the diffusion plate 526, and a front surface of the optical sheet 521 may be in close contact with the rear surface of the display panel 510 (refer to FIG. 1).

The optical sheet 521 may include at least one sheet. In detail, the optical sheet 521 may include one or more prism sheets and/or one or more diffusion sheets. A plurality of the sheets included in the optical sheet 521 may be in an adhesive state and/or in a close contact state.

The optical sheet 521 may be composed of a plurality of sheets having different functions. For example, the optical sheet 521 may include first to third optical sheets 521a to 521c. For example, a first optical sheet 521a may be a diffusion sheet, and second and third optical sheets 521b and 521c may be prism sheets. The number and/or positions of the diffusion and prism sheets may be changed.

The diffusion sheet 521 may prevent the light emitted from the diffusion plate 526 from being partially concentrated, thereby making light distribution more uniform. The prism sheet may condense light emitted from the diffusion sheet and provide the light to the display panel 510.

A coupling part may be formed on at least one of the sides or edges of the optical sheet 521. The coupling part may be formed on at least one of the first to third optical sheets 521a to 521c.

The coupling part may be formed on a long side of the optical sheet 521. The coupling part formed on a first long side and the coupling part formed on a second long side may be asymmetric. For example, it means that the positions and/or number of the coupling parts of the first long side and the coupling part of the second long side may be different from each other.

Figure 4:
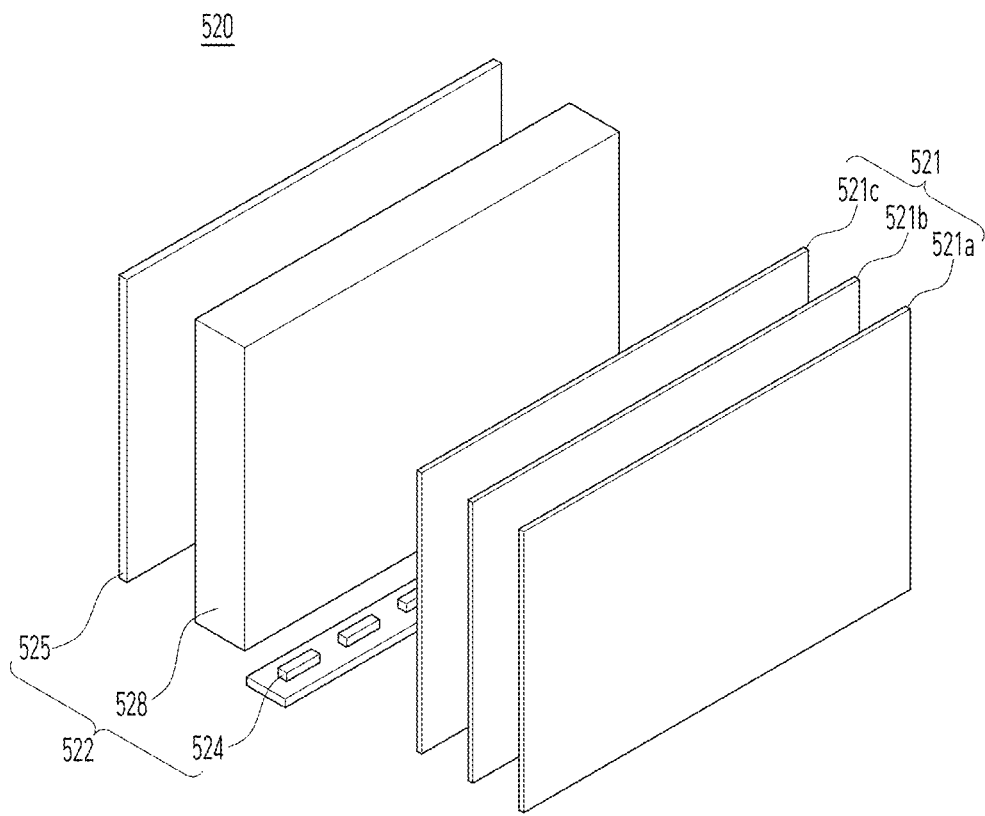
FIG. 4 is a diagram illustrating another embodiment of a backlight unit of a display device.

FIG. 4 is a diagram illustrating another embodiment of a backlight unit 520 of the display device 100. The backlight unit 520 of the present embodiment is an edge-type backlight unit 520 in which a light assembly 524 exists only in a lateral direction.

A substrate 5241 may be located on at least one side of another configuration of an optical layer 522. Light emitting lamps 5242 or optical assemblies 524 may be mounted on the substrate 5241. An electrode pattern for connecting an adapter and the light emitting lamp 5242 may be formed on the substrate 5241. For example, a carbon nanotube electrode pattern for connecting the light emitting lamp 5242 to the adapter may be formed on the substrate 5241. For example, the substrate 5241 may be a Printed Circuit Board (PCB).

The light emitting lamps 5242 may be disposed on the substrate 5241 at a predetermined interval. The light emitting lamp 5242 may be smaller than a thickness of a light guide plate 528. Therefore, most of the light provided by the light emitting lamp 5242 may be transmitted to the light guide plate 528.

The light emitting lamp 5242 may be a Light Emitting Diode (LED) chip or a light emitting diode package including at least one light emitting diode chip.

The light emitting lamp 5242 may be composed of a colored LED or a white LED that emits at least one color among colors such as red, blue, and green.

A light source included in the light emitting lamp 5242 may be a Chip On Board (COB) type. The COB type may be a type in which an LED chip, which is a light source, is directly coupled to the substrate 5241. Therefore, a process may be simplified. In addition, resistance may be lowered, and thus energy lost to heat may be reduced. That is, it means that power efficiency of the light emitting lamp 5242 may be increased. The COB type may provide brighter lighting. The COB type may be implemented thinner and lighter than the related art.

The light guide plate 528 may diffuse light incident from the light emitting lamp 5242. A reflective sheet 525 may be positioned behind the light guide plate 528. The reflective sheet 525 may reflect light provided from the light emitting lamp 5242. The reflective sheet 525 may reflect light introduced from the light guide plate 528 back to the front of the light guide plate 528.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide (TiO$_2$).

The reflective sheet 525 may be formed by depositing and/or coating a metal or a metal oxide. The reflective sheet 525 may be printed with ink containing a metal material. The reflective sheet 525 may have a deposition layer using vacuum deposition such as thermal deposition, evaporation, or sputtering. The reflective sheet 525 may have a coating layer and/or a printing layer formed by printing, gravure coating, or silk screen.

A diffusion plate (not shown) may be further included on a front surface of the light guide plate 528. The diffusion plate may diffuse light emitted from the light guide plate 528 forward.

An air gap may be positioned between the light guide plate 528 and the optical sheet 521. The air gap may disperse light emitted from the light emitting lamp 5242. Meanwhile, a resin 5243 (see FIG. 6) may be deposited on the light emitting lamp 5242 and/or the reflective sheet 525. The resin 5243 may diffuse light provided from the light emitting lamp 5242.

The optical sheet 521 may be located in front of the light guide plate 528. A rear surface of the optical sheet 521 may face the light guide plate 528, and a front surface of the optical sheet 521 may face a rear surface of the display panel 510.

The optical sheet 521 may include at least one sheet. The optical sheet 521 may include one or more prism sheets and/or one or more diffusion sheets. A plurality of the sheets included in the optical sheet 521 may be in an attached state and/or a close contact state.

For example, the optical sheet 521 may include first to third optical sheets 521a to 521c. The first optical sheet 521a may be a diffusion sheet, and the second and third optical sheets 521b and 521c may be prism sheets. The number and/or positions of the diffusion and prism sheets may be changed.

The diffusion sheet 521a may prevent the light emitted from the light guide plate 528 from being partially concentrated, thereby making the distribution of light uniform. The prism sheets 521b and 521c may condense the light emitted from the diffusion sheet 521a and provide the light toward the display panel 510.

Figure 5:
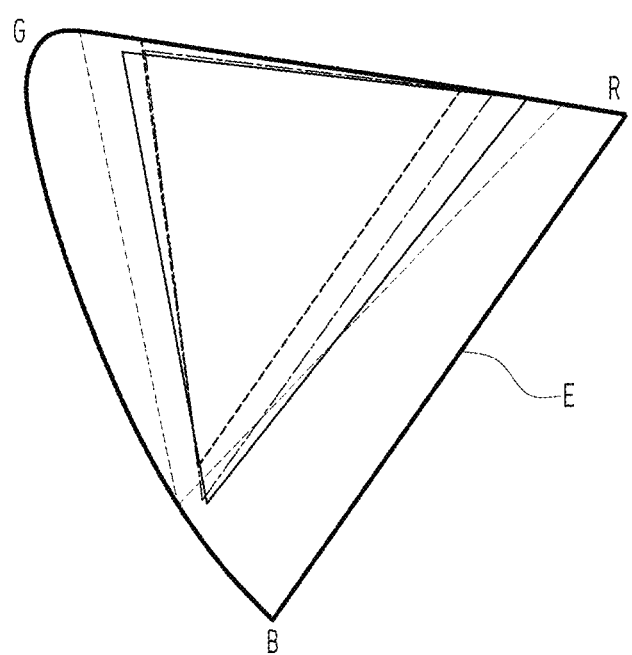
FIG. 5 is a graph of color coordinates.

FIG. 5 shows color coordinates. An outermost line E represents a range of colors visible to a human, and color coordinates may have a triangular shape having vertices of red (R), blue (B), and green (G). A line of a triangle shape located inside is the color coordinates representing colors that may be expressed by the display units 150. If the red (R), blue (B), and green (G) can be more accurately expressed, an area of the triangle may be widened, thereby increasing color reproducibility.

The color reproducibility is an index indicating how accurately the display unit 150 may display colors existing in nature. It refers to a range of colors that can be expressed by the display unit 150 among colors in the color coordinates representing colors that can be seen by humans.

The backlight unit 520 includes the light emitting lamp 5242, and recently, an LED is mainly used as the light emitting lamp 5242. The LED originally generates light of a short wavelength having a blue color, but may supply white light to the display panel by exciting it using a phosphor. Since the spectrum of white light is determined by a color conversion material to be excited, the color reproducibility may be determined by the color conversion material.

The color reproducibility represented by the backlight unit 520 that supplies white light using the color conversion material is determined by the color conversion material included in the backlight unit 520, and research on the positional combination of phosphors on the backlight unit 520 is continuing to obtain a higher color reproducibility.

An LED is mainly used as the light emitting lamp 5242 of the light assembly 524, and the LED is based on a blue LED that emits blue light. By adding a phosphor that converts light emitted from the blue LED into another color or using a color filter, it is able to implement an LED of another color.

A green phosphor may be added to a blue LED to convert some of blue light in a band of 440 to 460 nm into green light, thereby making white light. However, intensity of an output in a red region is weak and intensity of wavelength bands 510 to 660 nm across red and green is similar, so that a half width of the optical spectrum is large. If the half width is large, color separation is not clear, thereby causing a problem that the color reproducibility of the red and green regions is lowered.

Figure 6:
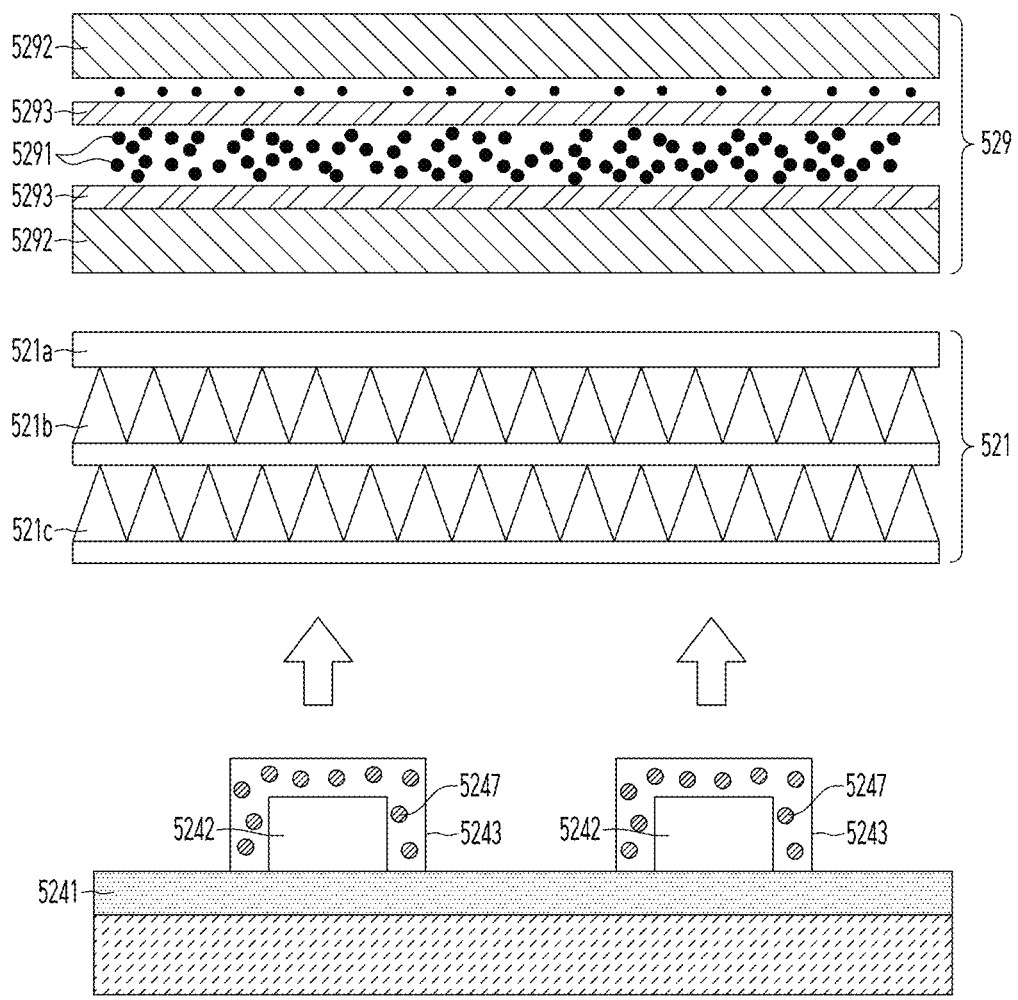
FIG. 6 is a conceptual diagram illustrating a backlight unit to which a high color reproduction quantum dot sheet including quantum dots is added.

FIG. 6 is a conceptual diagram showing a backlight unit 520 to which a high color reproduction quantum dot sheet 529 including a quantum dot 5291 is added, and intensity of a wavelength band (610~660 nm) in a red region may be improved by adding the high color reproduction quantum dot sheet 5291 implementing a red color to the backlight unit 520.

However, since the quantum dots 5291 are vulnerable to toxicity and moisture, additional materials such as barrier films 5292 and 5293 and the like are required to secure safety and reliability. Accordingly, there is a problem of increasing a size of a product and raising a material cost. In addition, a large number of particles of the quantum dots 5291 are required for the high color reproduction quantum dot sheet 529 and an amount of green phosphor in the light assembly 524 is also required due to conversion of green to red. In addition, since red is realized through two color conversions, the overall brightness of the backlight unit 520 is lowered and a color difference of an outermost portion of a screen occurs.

Accordingly, the present disclosure may implement a high color reproduction optical sheet 521 by omitting the high color reproduction quantum dot sheet 529 including the quantum dot 5291 and adding a Nano-Organic Material (NOM) capable of high color reproduction to the optical sheet 521 itself.

Figures 7, 8:
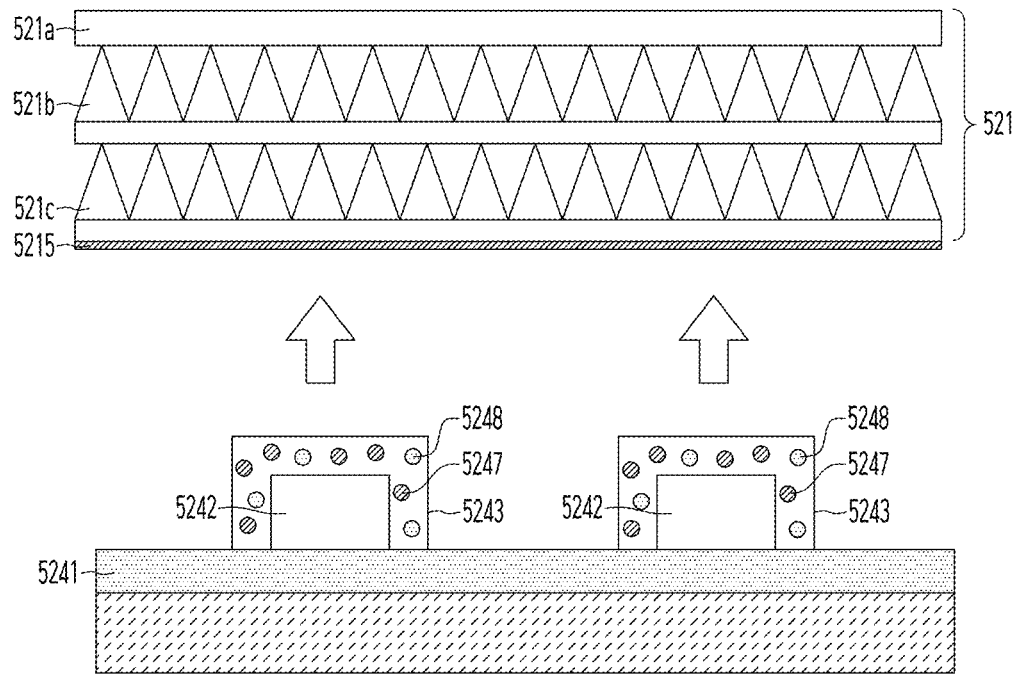
FIG. 7 is a conceptual diagram illustrating a backlight unit including a high color reproduction optical sheet of the present disclosure.
FIG. 8 is a table of brightness and color reproducibility (DCI) according to an amount of a third phosphor added to a rear coating layer of a backlight unit of the present disclosure.

FIG. 7 is a conceptual diagram showing a backlight unit 520 including a high color reproduction optical sheet 521 of the present disclosure, in which a light assembly 524 and an optical sheet 521 are illustrated. In FIG. 7, only the light assembly 524 and the optical sheet 521 are illustrated, and a light guide plate 528 or a diffusion plate 526 may be positioned between the light assembly 524 and the optical sheet 521. The diffusion plate 526 may be positioned in the direct type shown in FIG. 3, and the light guide plate 528 may be positioned in the edge type shown in FIG. 4.

As described above, when light is supplied to an area corresponding to a display area through the light guide plate 528 or the diffusion plate 526, an amount of phosphor required for sufficient light conversion increases, so the backlight unit 520 of the present disclosure may include a red phosphor in the light assembly 524 to minimize the amount of the consumed phosphor.

A first phosphor 5247 (green phosphor) that converts a first light (blue light) of a first wavelength band (440 to 460 nm) emitted from a light emitting lamp 5242 to a second light (green light) of a second wavelength band (510 to 560 nm) and a second phosphor 5248 (red phosphor) that converts blue light to a third light (red light) of a third wavelength band (610 to 660 nm) may be included.

Since blue light, green light, and red light are all emitted through the first phosphor 5247 and the second phosphor 5248, light outputted from the light assembly 524 becomes white light. However, in order to realize higher-purity white light, a third phosphor may be further provided to the optical sheet 521 of the present disclosure.

The third phosphor is a phosphor that converts the second light converted by the first phosphor 5247 into the third light, and a wavelength of a maximum value (peak) of the second light may be shifted to a short wavelength. In this case, there is an effect that the purity of green and red is improved while the half width of the spectrum of red and green is narrowed.

Since s high-purity blue light is emitted from the light emitting lamp 5242 itself, it is possible to implement a backlight unit 520 that emits better white light by improving the purity of red light and green light.

The optical sheet 521 may include a diffusion sheet, a brightness enhancement film, and prism sheets 521*b* and 521*c* to evenly disperse the light supplied from the light assembly 524. The optical sheet 521 according to the present embodiment may further include a diffusion sheet or a dual brightness enhancement film (DBEF) on front surfaces of the prism sheets 521*b* and 521*c* by stacking two prism sheets 521*b* and 521*c*.

Nano-Organic Material (NOM) may be added to the adhesive for adhesion between a pair of the prism sheets 521*b* and 521*c*, but in this case, the distribution of Nano-Organic Material (NOM) becomes uneven due to the prism shape, which may greatly reduce the brightness efficiency. Due to the characteristics of the adhesive, there is a problem that the temperature and humidity vary due to the large change in characteristics depending on temperature and humidity, or the brightness changes if there is thermal impact.

Accordingly, according to the present disclosure, a rear coating layer 5215 including a third phosphor, which is a Nano-Organic Material (NOM), may be formed on a rear surface of the optical sheet 521, that is, a rear surface of the prism sheet 521*c*. The third phosphor may be an organic phosphor including at least one of a pyromethene metal complex-based phosphor, a rhodamine-based phosphor, a DCM-based phosphor, and a peryleneimide-based phosphor.

The third phosphor may be mixed with a light-transmitting resin 5243 to form the rear coating layer 5215. As a content of the third phosphor is increased, the color reproducibility is improved, but there is a side effect of lowering the brightness.

Figure 9:
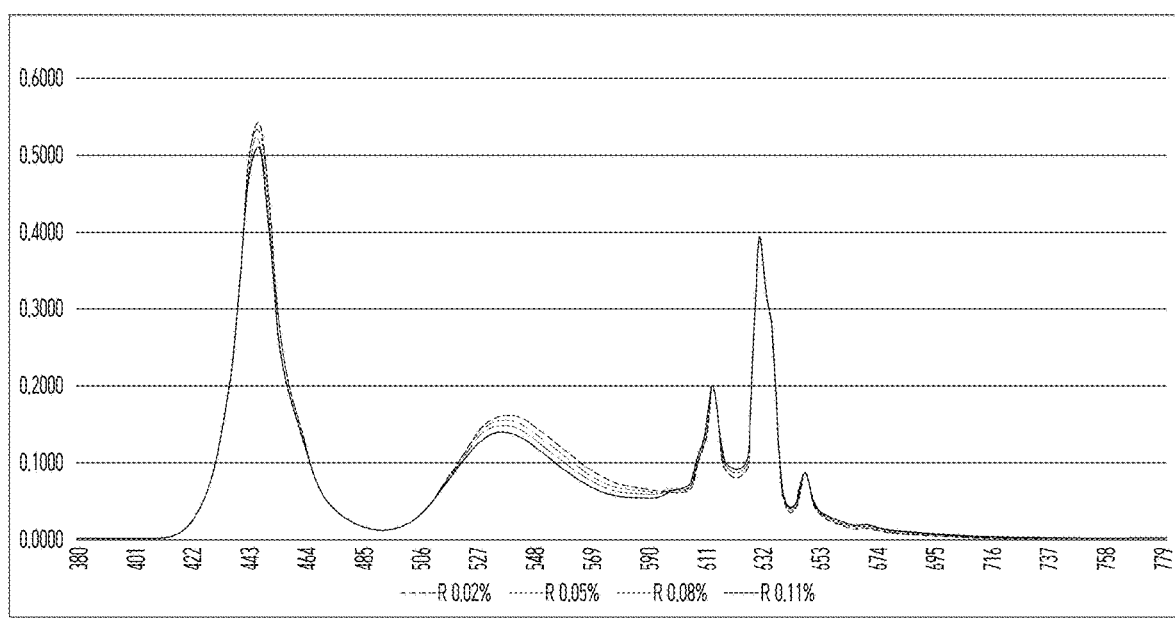
FIG. 9 is a graph of brightness according to an amount of a third phosphor.
Figure 10:
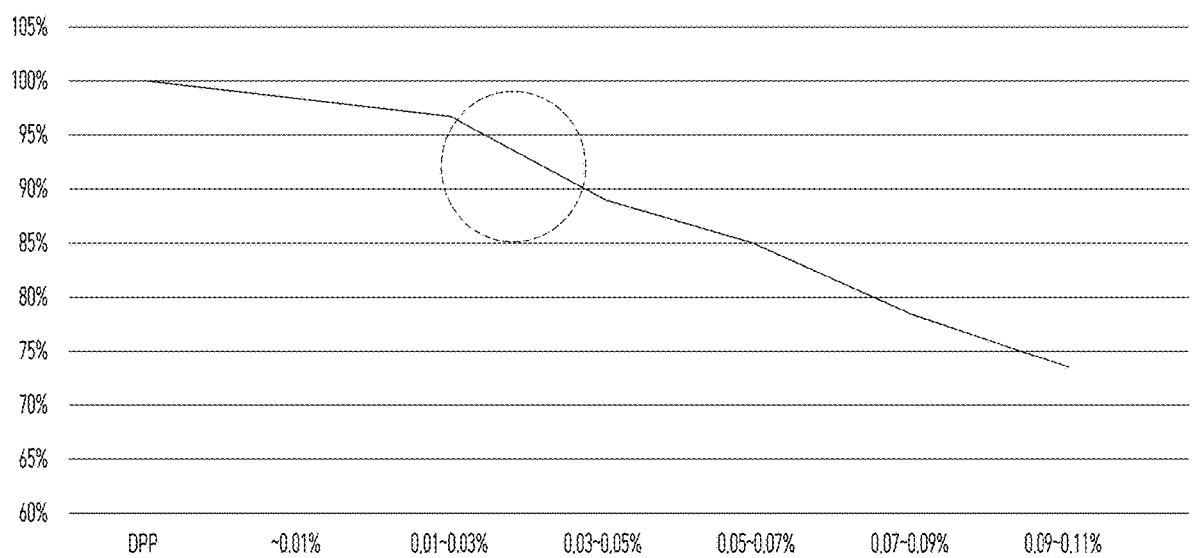
FIG. 10 is a graph of an optical spectrum according to an amount of a third phosphor.

FIG. 8 is a table showing brightness and color reproducibility (DCI) according to an amount of the third phosphor added to the rear coating layer 5215 of the backlight unit 520 of the present disclosure, FIG. 9 is a graph showing brightness according to the amount of the third phosphor, and FIG. 10 is a graph showing an optical spectrum according to the amount of the third phosphor.

Referring to FIG. 8, a control group serving as a reference (Ref.) is an existing optical sheet (DPP), and an experimental group is a high color reproduction optical sheet (DPP+ NOM_R) in which the third phosphor is added to the optical sheet 521.

In embodiments, the rear coating layer 5215 of the high color reproduction optical sheet 521 includes the third phosphor having six kinds of different contents up to 0.11%, wherein NOM_R #1 includes the third phosphor of 0.01% or less and NOM_R #6 includes the third phosphor of 0.09 to 0.11%. In this case, it may be confirmed that the brightness improves as the amount of the third phosphor increases, but the brightness efficiency decreases as the amount of the third phosphor increases.

Referring to the graph of FIG. 9, as the amount of the third phosphor increases, a peak point of a second wavelength band moves toward a short wavelength. However, since a magnitude of the value decreases, it may be confirmed that the light intensity decreases.

Referring to the graph of FIG. 10, when the third phosphor of 0.03% or more is included, brightness rapidly decreases, and thus the third phosphor preferably includes 0.03% or less. However, when it is equal to or less than 0.01%, there is little change in color reproduction, and thus, it is preferable that the third phosphor of 0.01% to 0.03% is included in the rear coating layer 5215.

Since the third phosphor converts the second light into the third light, the amount of the first phosphor 5247 included in the light assembly 524 may be greater than that of the second phosphor 5248.

The backlight unit 520 of the present disclosure may omit the high color reproduction quantum dot sheet to improve color reproduction, whereby the price may be lowered and the volume may be reduced.

In addition, it is possible to prevent the color reproducibility of the screen from appearing unevenly according to the distribution of quantum dots.

In addition, it is possible to reduce the manufacturing cost by reducing the amount of phosphor used.

The above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A backlight unit, comprising:
  a light assembly having a light emitting lamp emitting a first light of a first wavelength band and a resin cover surrounding the light emitting lamp and including a first phosphor and a second phosphor; and
  an optical sheet including a third phosphor and optically converting an incident light of the light assembly incident on a rear surface to emit the optically converted light to a front surface,
  wherein the first phosphor converts the first light into a second light of a second wavelength band greater than the first wavelength band,
  wherein the second phosphor converts the first light into a third light of a third wavelength band greater than the second wavelength band, and
  wherein the third phosphor converts the second light into the third light of the third wavelength band.

2. The backlight unit of claim 1, the optical sheet comprising:
  a prism sheet; and
  a coating layer including the third phosphor and formed on a rear surface of the prism sheet.

3. The backlight unit of claim 2, wherein the third phosphor included in the coating layer is equal to or greater than 0.01% and equal to or smaller than 0.03%.

4. The backlight unit of claim 1, wherein the third phosphor emits a red light having a maximum light emitting wavelength in a range of 610 to 660 nm.

5. The backlight unit of claim 1, wherein the third phosphor includes a nano organic material.

6. The backlight unit of claim 1, wherein the third phosphor includes at least one of a pyromethene metal complex-based phosphor, a rhodamine-based phosphor, a DCM-based phosphor, or a peryleneimide-based phosphor.

7. The backlight unit of claim 1, wherein the first wavelength band includes 440 to 460 nm, wherein the second wavelength band includes 510 to 560 nm, and wherein the third wavelength band includes 610 to 660 nm.

8. The backlight unit of claim 1, wherein the light emitted from the optical assembly is a white light obtained by synthesizing the first light, the second light, and the third light.

9. The backlight unit of claim 1, wherein the first phosphor includes a green phosphor and wherein the second phosphor includes a red phosphor.

10. The backlight unit of claim 1, wherein an amount of the second phosphor is less than that of the first phosphor.

11. A display device, comprising:
a display panel; and
a backlight unit located on a rear surface of the display panel to supply light to the display panel, the backlight unit comprising:
   a light assembly having a light emitting lamp emitting a first light of a first wavelength band and a resin cover surrounding the light emitting lamp and including a first phosphor and a second phosphor; and
   an optical sheet including a third phosphor and optically converting an incident light of the light assembly incident on a rear surface to emit the optically converted light to a front surface,
wherein the first phosphor converts the first light into a second light of a second wavelength band greater than the first wavelength band,
wherein the second phosphor converts the first light into a third light of a third wavelength band greater than the second wavelength band, and
wherein the third phosphor converts the second light into the third light of the third wavelength band.

* * * * *